March 11, 1958  J. C. SETECKA  2,826,078
ADJUSTABLE MEASURING RECEPTACLE
Filed Aug. 15, 1955
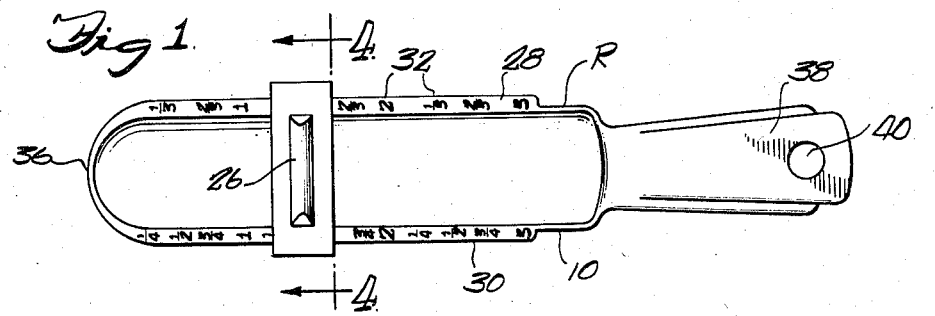
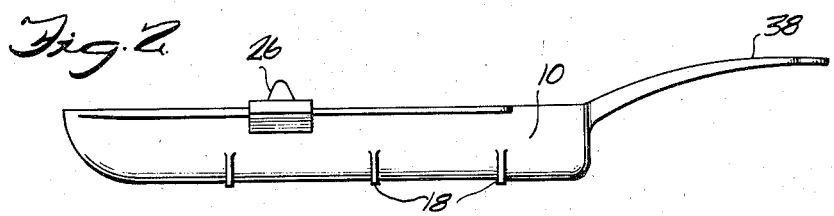
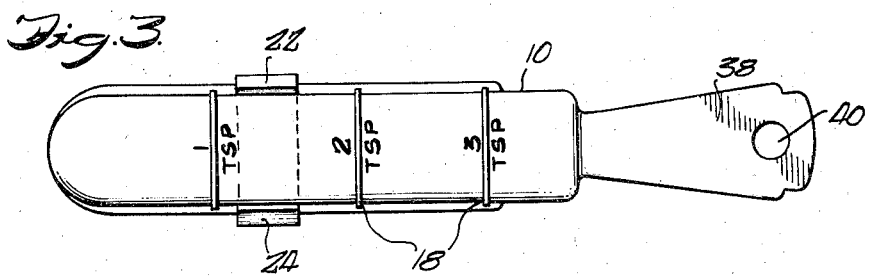
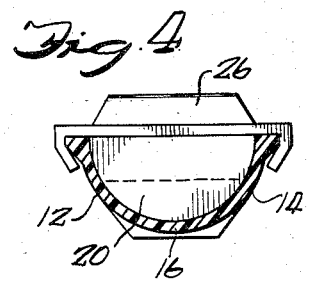
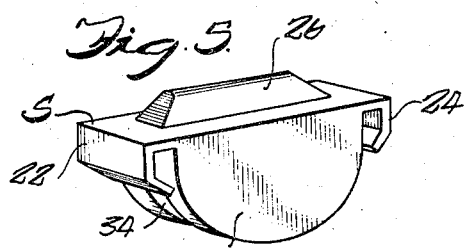
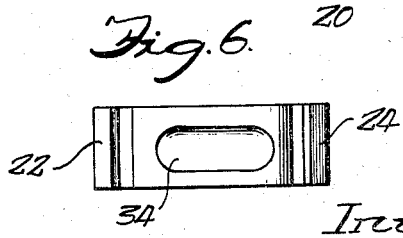
Inventor
John C. Setecka
Attorney

2,826,078
ADJUSTABLE MEASURING RECEPTACLE

John C. Setecka, Chicago, Ill., assignor to Measure-All Corporation

Application August 15, 1955, Serial No. 528,261

7 Claims. (Cl. 73—429)

This invention relates to a measuring receptacle and more particularly relates to a two-piece household measuring receptacle which is capable of accurately measuring various quantities of materials.

Measuring devices presently being used by the housewife and the like, consist of numerous spoons, each spoon having a definite quantitative limitation into which any liquid or solid material may be placed. There have been some measuring devices which have attempted to incorporate into one device the varying quantitative amounts needed in measuring devices for cooking and the like. These devices have been unsuccessful because of the complicated mechanism and because suitable cooperation between elements was not achieved to permit the measuring device to be used by both liquids and solids as well as to permit ready disassembly of the device for purposes of cleaning.

The obvious advantage of providing a single measuring device which is capable of measuring different quantities is apparent. The housewife need not carry a large number of measuring spoons and additionally, the use of one measuring device will expedite the work usually found in cooking.

Heretofore, I have invented a measuring receptacle which has been described and shown in United States Letters Patent 2,697,353. The present invention constitutes an improvement over that receptacle. The advantages that my new and improved measuring device have over the receptacle shown and described in the aforesaid patent will become apparent from the description which follows.

A general object of this invention, therefore, is to provide a measuring device which is capable of accurately measuring both solids and liquids.

Another object of this invention is to provide a measuring device comprising several relatively simple elements which are inexpensive to manufacture and which cooperate in a novel manner to permit fast and accurate measuring of varying quantities of materials.

Still another object of this invention is to provide a measuring device which can be readily assembled and disassembled for cleaning purposes.

Still another object of this invention is to provide a measuring device which can cleanly remove the entire contents of any liquid from the receptacle by employing a squeegee action.

Further objects and advantages of the present invention will become apparent as the following description of an illustrative embodiment proceeds, taken with the accompanying drawings, in which:

Figure 1 is a top plan view of my new and improved measuring device.

Fig. 2 is a side elevational view.

Fig. 3 is a bottom plan view thereof.

Fig. 4 is a cross-sectional view taken on line 4—4 of Fig. 1.

Fig. 5 is a perspective view of the sliding element, and

Fig. 6 is a bottom plan view of the sliding element.

Referring to the drawings in detail, my adjustable measuring device is generally indicated by the letter R and comprises a hollow, trough-shaped receptacle 10 having side walls 12 and 14 and a bottom 16 which, on the interior, forms a unitary semi-circular trough. Integrally molded to the outer wall of the bottom 16 of the receptacle 10 are a plurality of lateral ribs 18 upon which the receptacle may be placed. The ribs preferably are spaced at selected intervals to correspond to appropriate measurements such as one teaspoon, two teaspoons, three teaspoons, etc., as shown in Fig. 3. The primary purpose of these ribs is to allow the user to place the receptacle upon a flat surface, such as a table or the like, without tilting the receptacle and its contents.

Mounted slidably and detachably within the receptacle 10 is a sliding element S. The stop slide S has a forwardly presented damming wall 20 which is shaped to fit the interior contour of the receptacle 10.

The receptacle 10 is preferably made of a substantially rigid plastic material, such as polystyrene, and the stop-slide is preferably made of a somewhat pliable plastic material, such as polyethylene. It has been found that the coaction between the receptacle and slide when made of these materials, gives greater qualities of adhesion than is found with metals or other materials. In addition, the slide is able to move lengthwise of the receptacle in an easy manner without fear of losing direct line contact with the receptacle to prevent leakage when the receptacle is filled with a liquid. The stop-slide S may be of any desired width but it has been found that a width of about one quarter of an inch (¼") or the like insures a liquid-tight fit when the measuring device is used to measure water or other liquids.

The slide S has a pair of guide flanges 22 and 24 secured to the top of the damming wall 20 and at either side thereof. The ends of the guide flanges are turned slightly inwardly, the importance of which will be pointed out hereinafter. Integral to the top of the damming wall 20 is a lug 26 which may be grasped to move the slide within the receptacle as well as to aid in removing the stop-slide from the receptacle.

The underside of the flanges 22 and 24 rest and slide upon elongated lips 28 and 30 integrally formed.

The lips 28 and 30 are tapered slightly at the forward end of the receptacle and terminate a short distance from the end of the side walls 12 and 14, the distance being slightly greater than the width of the slide S which can be moved rearward out of engagement with the lips 28 and 30 in order to permit vertical removal. The lips 28 and 30 are substantially flat at the top and are inclined inwardly at the bottom to form ridges which are engaged by the inturned portion of the flanges 22 and 24 of the slide, positioning the slide in contact with the trough to insure a tight fit between these elements. The lips 28 and 30 are marked as by hot-stamping or indentations with indices 32 which are commensurate with the quantitative amounts of the receptacle when the damming wall 20 of the slide S is in line with the particular index.

The slide S, at its bottom-most portion, may have some of the plastic material removed to form a bifurcated portion 34 (Fig. 6) which eliminates the amount of material necessary to be used and also helps serve as a more effective squeegee when liquids or sirupy materials are used by increasing the resiliency of the slide. In this respect, it is to be noted that the forward end of the receptacle 10 is inclined slightly forward and rounded out as at 36 and is shaped so that the slide S may be forced therethrough without breaking contact with the trough. Thus, when a liquid or sirupy substance is used in the receptacle 10, all of the contents may be removed by merely urging the slide forward and up the incline of the rounded end 36 to squeegee out the liquid or sirupy substance leaving the receptacle clean and dry. Because the lips 28 and 30 are tapered at this end and because of the bifurcated portion 34 permitting bending of the bottom of the damming wall 20 when the slide S is advanced in a squeegee action along the incline at 36, the slide can be moved forward and the flanges 22 and 24 will ride free from the lips. This was not possible with the measuring device described in United States Patent 2,697,353.

At the other end of the receptacle is a handle 38 for holding the receptacle during use. The handle may be provided with an opening 40 to hang the measuring device up when not in use.

My measuring device can be readily disassembled by merely grasping the lug 26 atop the slider S and pulling rearwardly. Because the lips 28 and 30 do not extend back the full length of the receptacle 10, an area is afforded wherein the flanges 22 and 24 of the slide S are disengaged from the lips 28, 30, and by pulling the slide upwardly at this point, the slide is disengaged from the receptacle 10. The measuring device can then easily be cleaned by rinsing the receptacle 10 and the slide S. To assemble the measuring device, the process is reversed until the slide has been urged forward to that portion of the receptacle that the user desires to measure a quantity of material.

Thus, it is to be seen that my measuring device comprises only two elements which cooperate in a novel manner to provide a new and efficient measuring device which can be readily adjusted to select a desired quantity of contents, whether solid or liquid, to be measured. In addition, when a liquid or sirupy substance is used, the receptacle can be cleanly emptied by urging the slide forward and out the rounded end of the receptacle. My measuring device also affords the additional advantage of providing means so that the measuring device can be placed in a level position upon a flat surface when the user is unable to hold the measuring device by the handle.

While I have shown a preferred form of my invention for the purpose of illustration, it will be apparent to those skilled in the art that the details set forth can be varied widely without departing from the spirit of my invention.

I claim as my invention:

1. An adjustable measuring device for domestic use comprising a hollow trough-shaped receptacle and a stop-slide detachably mounted in said receptacle, said receptacle having elongated lips integrally formed on its uppermost sides, said lips being disposed from substantially the forward end of said receptacle to a distance somewhat less than the length of the sides of the receptacle to permit removal of the slide from the receptacle, said lips having measuring indicia formed thereon, said slide having a damming wall corresponding to the inner cross-sectional contour of the inside of the receptacle, said damming wall having a resilient lower portion and a reinforced portion spaced from the bottom of the wall, guide flanges attached to said slide corresponding in shape to the contour of said elongated lips to slidably engage said lips, means mounted on said slide to permit manipulation of said slide whereby the damming wall may be positioned in alignment with the indicia to provide the desired capacity between the wall and the forward end of the receptacle, said forward end being slightly inwardly tapered and shaped as a general continuation of the trough with a decreasing depth to permit the damming wall of the slide to be forced therethrough to squeegee material out the forward end of said receptacle, means at the other end for holding said receptacle, and lateral ribs at the bottom of said receptacle having flat bottom surfaces to maintain the receptacle level when placed upon a table or similar surface.

2. An adjustable measuring device for domestic use comprising a hollow trough-shaped receptacle and a stop-slide detachably mounted in said receptacle, said receptacle having elongated lips integrally formed on its uppermost sides, said lips having measuring indicia formed thereon and inwardly inclined lower portions, said slide having a damming wall corresponding to the inner cross-sectional contour of the inside of the receptacle, said damming wall having a resilient lower portion and a reinforced portion spaced from the bottom of the wall, guide flanges attached to said slide corresponding in shape to the contour of said elongated lips to slidably engage said lips and having inturned portions engaging said inclined portions of the lips to position the damming wall in sealing contact with the receptacle, means mounted on said slide to permit manipulation of said slide whereby the damming wall may be positioned in alignment with the indicia to provide the desired capacity between the wall and the forward end of the receptacle and means for holding said receptacle.

3. An adjustable measuring device for domestic use comprising a hollow trough-shaped receptacle and a stop-slide detachably mounted in said receptacle, said receptacle having elongated lips integrally formed on its uppermost sides, said lips having measuring indicia formed thereon and inwardly inclined lower portions, said slide having a damming wall corresponding to the inner cross-sectional contour of the inside of the receptacle, said damming wall having a resilient laterally bifurcated lower portion, guide flanges attached to said slide corresponding in shape to the contour of said elongated lips to slidably engage said lips and having inturned portions engaging said inclined portions of the lips to position the damming wall in sealing contact with the receptacle, means mounted on said slide to permit manipulation of said slide whereby the damming wall may be positioned in alignment with the indicia to provide the desired capacity between the wall and the forward end of the receptacle, said forward end being slightly inwardly and upwardly tapered to permit the damming wall of the slide to be forced therethrough to squeegee material out the forward end of said receptacle, the forward ends of the lips being shaped so as to disengage the guide flanges to permit movement of the damming wall through the tapered forward end of the trough and means at the other end for holding said receptacle.

4. An adjustable measuring device for domestic use, comprising: a receptacle having an open trough formed therein and having lips formed adjacent to and extending along the trough; and a stop-slide detachably mounted in the trough having a resilient damming wall corresponding to the contour of the trough, said stop-slide having guide flanges corresponding in shape to the contour of said lips to slidably engage the lips and position the damming wall in engagement with said trough, and a wall reinforcing portion behind said wall and spaced from the lower edge of the wall to support the wall and limit the resilient flexure of the wall occurring when the slide is moved in the trough.

5. The adjustable measuring device of claim 4 wherein the receptacle and the stop-slide are formed from resilient plastic materials.

6. An adjustable measuring device for domestic use, comprising: a receptacle having an open trough formed therein and having lips formed adjacent to and extending along the trough; and a stop-slide detachably mounted in the trough having a resilient damming wall corresponding to the contour of the trough, said stop-slide having guide flanges corresponding in shape to the contour of said lips to slidably engage the lips and position the damming wall in engagement with said trough, and a wall reinforcing portion behind said wall and spaced from the lower edge of the wall to support the wall and limit the resilient flexure of the wall occurring when the slide is moved in the trough, said lips of the receptacle extending a distance less than the length of the trough so that the guide flanges of the slide can be moved out of engagement with the lips to permit removal of the slide from the receptacle.

7. An adjustable measuring device for domestic use, comprising: a receptacle having an open trough formed therein and having lips formed adjacent to and extending along the trough; and a stop-slide detachably mounted in the trough having a resilient damming wall corresponding to the contour of the trough, the stop-slide having guide flanges corresponding in shape to the contour of said lips to slidably engage the lips and position the damming wall in engagement with said trough, and the stop-slide having a reinforced portion behind said wall and spaced from the lower edge of the wall to support the wall and limit the resilient flexure of the wall occurring when the slide is moved in the trough, said lips of the receptacle having measuring indicia thereon and the slide being positionable adjacent selected indicia to provide a desired capacity between the wall and the forward end of the receptacle.

References Cited in the file of this patent

UNITED STATES PATENTS

| | | |
|---|---|---|
| 135,590 | Robinson | Feb. 4, 1873 |
| 1,324,264 | Parent | Dec. 9, 1919 |
| 1,614,270 | Zifferer | Jan. 11, 1927 |
| 2,165,642 | Mayer | July 11, 1939 |
| 2,389,530 | Miner | Nov. 20, 1945 |
| 2,555,956 | Chester | June 5, 1951 |
| 2,697,353 | Setecka | Dec. 21, 1954 |
| 2,747,410 | Dubin | May 29, 1956 |